United States Patent [19]

Bachman et al.

[11] 4,210,431
[45] Jul. 1, 1980

[54] METHOD FOR MAKING VITREOUS CARBON COATINGS ON GLASS FIBERS

[75] Inventors: David L. Bachman, Lindley; Francis W. Voorhees, Painted Post, both of N.Y.

[73] Assignee: Corning Glass Works, Corning, N.Y.

[21] Appl. No.: 969,988

[22] Filed: Dec. 15, 1978

[51] Int. Cl.² ............................................. C03C 25/02
[52] U.S. Cl. ..................................... 65/3 C; 65/60 B; 427/228
[58] Field of Search .................... 65/2, 3 A, 3 C, 3 R, 65/60 B; 427/318, 314, 228

[56] References Cited

U.S. PATENT DOCUMENTS

| | | | |
|---|---|---|---|
| 2,016,139 | 10/1935 | Eddison | 427/228 |
| 3,300,334 | 1/1967 | Gosnell | 65/3 C X |
| 3,428,519 | 2/1969 | Zvanut | 65/3 R X |
| 3,791,847 | 12/1974 | Araki et al. | 427/228 X |
| 4,076,510 | 2/1978 | Mracek et al. | 65/3 A |

FOREIGN PATENT DOCUMENTS 7602397  9/1976  Netherlands .............................. 65/3 A

*Primary Examiner*—Robert L. Lindsay, Jr.
*Attorney, Agent, or Firm*—Milton M. Peterson; Clinton S. Janes, Jr.

[57] ABSTRACT

There is disclosed a highly refractory substrate having a vitreous carbon coating formed on its surface, and a method of forming such coating by contacting the substrate, while hot, with an organic material in liquid form. In one form, the substrate is a drawn glass filament which may be coated as part of the drawing operation, and which may, for example, be an optical filament useful in an optical waveguide system.

11 Claims, 2 Drawing Figures

METHOD FOR MAKING VITREOUS CARBON COATINGS ON GLASS FIBERS

BACKGROUND OF THE INVENTION

This invention concerns the production of a vitreous carbon coating on a highly refractory substrate by thermally decomposing a carbon-containing organic material and depositing the carbon thus formed on the refractory substrate.

The art of coating refractory bodies, such as glass and ceramic bodies, has developed along several different lines and provides a wide diversity of properties and products. Thus, electrical resistance elements are produced on glass and ceramic cane or tubing by applying a metal, a metal oxide, or a carbon film on the surface of the body. Glass articles have also been coated with various lubricants such as fatty acids and oils. Silicones are used to render surfaces hydrophobic, and these materials, as well as varnishes and enamels, are used for electrical insulation.

One of the older coating arts is the impregnation of porous refractory bodies with carbonaceous materials such as asphalt, tar, pitch and the like, to render the body resistant to corrosive or erosive influences of a physical and/or chemical nature. The impregnated or coated body may be subsequently baked to remove a solvent and/or set the carbonaceous material. Such practices are typically illustrated in U.S. Pat. Nos. 238,806 (1881) and 1,266,335 (1918). Experience has shown that such materials are difficult to apply, and also subsequently handle, when used as coatings. Also, for many purposes, they are quite unsatisfactory in a technical sense, for example, where abrasion resistance is significant.

It is common practice to deposit a carbon coating by thermally decomposing an organic material to form carbon as a solid decomposition product. Such decomposition may be effected within the pores of a porous body after the body has been impregnated with a suitable organic material. This is a basis for solid body carbon resistors. Alternatively, the material decomposed may be a hydrocarbon gas that, in part at least, constitutes the atmosphere surrounding a body. In this case, the body serves as a substrate, and the carbon deposits within pores or on a surface depending upon the nature of the substrate body. Where a smooth surface substrate is employed, this procedure is the basis of carbon-coated resistors. As a general rule, carbon deposited after thermal decomposition is in particulate form and must be physically protected.

There is a form of carbon known as vitreous carbon. This is a hard material that is resistant to abrasion, that has an amorphous form, and that is termed "vitreous" because of its non-crystalline structure and its glass-like properties. This form of carbon is normally produced in the form of a solid body by applying a combination of high pressure and temperature to carbon in a closed chamber. However, a form of hard carbon, apparently similar in nature to vitreous carbon, has been reported in the description of an electrical resistor produced by impregnation of a porous ceramic body with carbon produced by thermal decomposition.

PURPOSE OF THE INVENTION

It has been recognized that a hard, abrasion-resistant, carbon film, with the electrical characteristics of ordinary particulate carbon films, would be highly useful. However, the use of a gaseous hydrocarbon atmosphere requires considerable care, and is frequently considered to be impractical as an industrial production method. Hence, a more practical production method is required to permit full utilization of such a film.

Recently, a further need has arisen for a film that would be highly resistant to abrasion and similar physical abuse, while also possessing a long term immunity to moisture penetration. This need is in connection with waveguide production wherein a pin hole-free film would be applied to a glass filament. Consequently, it would be most desirable to provide a process of applying the film to the filament while the latter is being drawn.

It is the basic purpose of this invention to meet the various needs expressed above. Other purposes met by, and advantages supplied by, the invention will be apparent from the subsequent description.

SUMMARY OF THE INVENTION

Our invention represents a measure of success in achieving the stated purposes. It stems from our discovery that a vitreous carbon film can be produced on a refractory surface by contacting that surface, while the surface is at a sufficiently high temperature, with a thermally decomposable organic material in liquid form, and maintaining the organic material in contact with such surface until the temperature of the surface is cooled below the oxidation temperature of the carbon deposited on the surface. The thermal decomposition reaction takes place essentially instantaneously, the depth of the layer of vitreous carbon produced being dependent upon the time the contact is maintained at the reaction temperature.

The invention then is a method of producing a vitreous carbon coating on the surface of a highly refractory substrate. It comprises providing a refractory substrate that is at a temperature in excess of about 1000° C., bringing the hot substrate into contact with a thermally decomposable organic material in liquid form, thermally decomposing the organic material to form a vitreous carbon coating on the substrate surface, cooling the substrate in contact with the organic material, and then discontinuing such contact when the substrate temperature has been reduced below about 400° C. The heated substrate is preferably contacted with a liquid organic by immersion in a bath. A normally solid organic material that has been liquefied by heating, provides a particularly suitable bath. In one specific embodiment of the invention, the refractory substrate is a drawn glass filament which is passed through a bath of liquid organic material as it is drawn from a parent glass body, and the product is an improved optical waveguide.

PRIOR ART

In addition to the art previously mentioned, attention is directed to the following U.S. Patents:

U.S. Pat. No. 2,556,616 (Ellis) discloses the production of a carbon-containing, solid body resistor by impregnating a porous glass body with a saccharide and then firing the impregnated body to decompose (carbonize) the saccharide to carbon.

U.S. Pat. No. 2,057,431 (Hobrock) discloses a typical gaseous hydrocarbon decomposition procedure for producing resistance elements. Porous substrates are mechanically fed down the length of a tube in which a methane series hydrocarbon gas atmosphere is maintained and "heated to its disassociation temperature to precipitate nascent carbon which permeates the elements".

U.S. Pat. No. 2,487,581 (Palumbo) is concerned with production of an electrical resistor consisting of a selected porous refractory oxide body impregnated with a pure, hard, oxidation-resistant carbon. The carbon is produced by heating the porous refractory to a temperature of 800° to 1400° C. in an atmosphere of a carbon-rich hydrocarbon gas such as methane, ethane or acetylene.

GENERAL DESCRIPTION

The invention provides a vitreous carbon coating or film on any substrate material that is sufficiently refractory to withstand the requisite elevated preheating temperature without deformation or other damage. Among the suitable materials are ceramics, high silica glasses, and metals that are capable of withstanding temperatures on the order of 1000° C. and above. As subsequently described, a substrate of particular interest is a high silica glass filament.

The vitreous carbon formed on the substrate surface is of a completely amorphous nature, that is, it shows no sign of crystalline structure when studied petrographically. The films have a metallic black appearance and a relatively high reflectivity, on the order of 40% as compared to aluminum. They demonstrate a hardness greater than normal glass surfaces, and are exceptionally resistant to abrasion. They resist oxidation at temperatures up to about 400° C. and are electrically conductive.

The key feature of the invention is formation of a vitreous carbon film by enclosing a preheated substrate within a body or mass of thermally decomposable organic in liquid form, and maintaining such enclosure as the substrate cools. We find that it is critical that the substrate be preheated to a relatively high temperature, generally above about 1000° C. When lower preheat temperatures are employed, either essentially no film formation is obtained, or the film that forms fails to possess the desired hard vitreous nature.

When a hot substrate is suddenly immersed in, or otherwise contacted with, a thermally decomposable organic in liquid form, the substrate cools rapidly. Nonetheless, if the preheat temperature is sufficiently high, there appears to be at least a small temperature range in which the organic disassociates or decomposes within the immediate vicinity of the substrate surface to form carbon which immediately deposits on the surface. Further, with a sufficiently high temperature, the carbon film that forms is a vitreous or hard carbon film that is resistant to oxidation.

As demonstrated later, the thickness of such carbon coating, as well as other properties, depends to some extent on the substrate temperature. Another factor, of course, is substrate geometry or size. Thus, a solid body will normally receive a vitreous carbon deposit under somewhat lower preheat temperature conditions than an extremely thin filament or ribbon of glass.

The organic material employed may be any available hydrocarbon, or derivative thereof, e.g., esters, acids, alcohols, etc., that is normally liquid or is capable of being liquefied by heating to a moderate temperature, i.e., less than about 400° C., and that will also undergo thermal decomposition to produce free carbon. As indicated earlier, gaseous hydrocarbons are avoided because of the hazards encountered in their use. For similar reasons, we prefer to avoid the short chain hydrocarbons and derivatives that tend to be more volatile and have a flash point lower than about 200° F. Rather, we prefer to employ solid materials, such as paraffins, olefins, aromatics, waxes, glycols, tars, and asphalt, which can be liquefied by moderate heating. In general, monomeric materials are more easily liquefied, and hence preferred.

Contact with, and enclosure of the substrate by, the organic may be accomplished by any of the procedures commonly known and used in the art. In general, it is most convenient to immerse the preheated substrate body into a bath of liquid, or liquefied, material. Once contact is established, it may be maintained until the substrate body reaches the temperature of the contacting material, or ambient temperature as the case may be.

Where faster production procedures are required, the carbon film substrate may be removed once its temperature has fallen to about 400° C. Above that temperature, even vitreous carbon tends to oxidize. Unlike softer carbon deposits, however, the vitreous carbon film of the present invention is resistant to oxidation below about 400° C. In any case, once the filmed substrate is withdrawn from the bath or other contacting medium, it is washed and may now have terminals applied thereto, or be otherwise processed depending on its ultimate application.

The present invention is not limited to any specific means of bringing the organic material and the substrate into contact. However, the invention has particular utility in the production of optical waveguides, and more especially the application of a protective coating thereto. Accordingly, the invention is now further illustrated with reference to this utility and to the accompanying drawing wherein:

SPECIFIC EMBODIMENTS OF THE INVENTION

Optical waveguides, and optical filaments forming the transmission element thereof, have achieved great importance recently as a potential answer to transmission facilities for the mushrooming communications field. Structurally, an optical filament will be of minute cross section, e.g., 250 microns in diameter, and of great length, e.g., a kilometer or more. The filament is a composite of a light transmitting core and a compatible cladding of lower refractive index material, both members conventionally being glasses.

Optical filaments are frequently required to possess a minimum degree of mechanical strength in order to avoid breakage during cabling and/or installation operations. Further, it has been common practice to provide such filaments with organic lubricating coatings to minimize the high coefficient of friction normally encountered in fresh glass surfaces. However, such coatings are not effective to exclude moisture penetration, and it has recently been observed that initially adequate strengths in optical filaments may fall off rapidly with age. This deterioration is ascribed to moisture attack on flaws that are inherent in the drawn filament, such attack occurring because the coatings employed are not impermeable to moisture.

Because they are impervious to moisture, vitreous carbon films, produced in accordance with the present invention, provide an effective solution to the optical filament problem. Not only are such coatings valuable because of their resistance to moisture penetration, but they also provide a hard, abrasion-resistant surface that reduces the degree of care required in filament handling.

Figure 1:
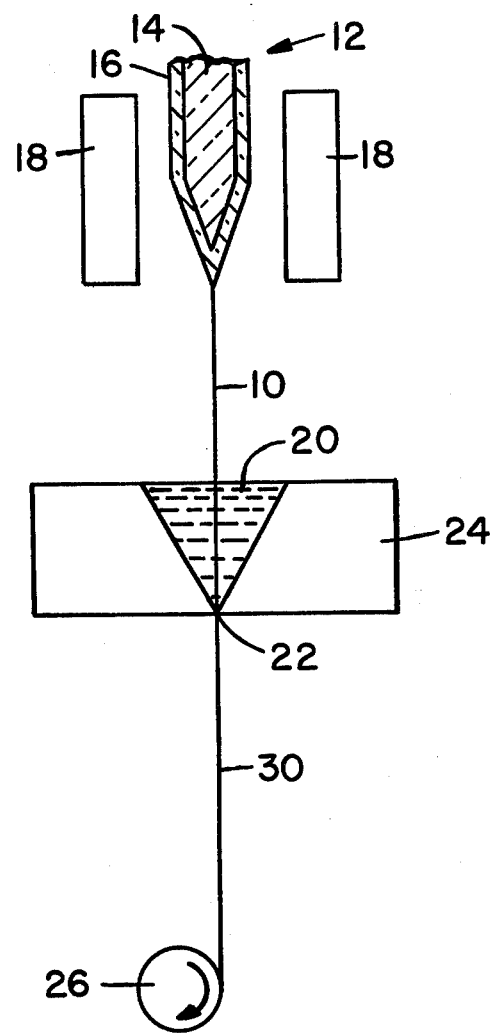
FIG. 1 is a schematic illustration, with certain elements in cross-section, of one means for carrying out the process of the invention and, FIG. 2 is a view in cross-section of an optical waveguide filament in accordance with the invention.

FIG. 1 illustrates a technique for applying a vitreous carbon coating to an optical filament in accordance with the invention. In this FIGURE, a composite glass filament 10 is shown being drawn from a preformed composite glass blank 12 which consists of a glass waveguide core preform 14 and a glass outer layer or cladding 16. Composite glass blank 12 may have been produced by a procedure such as described in U.S. Pat. Nos. 3,711,262 or 3,737,292. Reference is made to the prior art in general, and these patents in particular, for further details regarding procedures for the production of composite glass blanks such as blank 12.

Composite blank 12 is thermally softened as by heaters 18 in accordance with standard glass redraw practice. In accordance with the present day practice of forming fused oxide-type optical filaments, it is customary to redraw a blank such as 12 at a temperature in the range of 1500° to 2000° C.

As filament 10 is drawn from blank 12, and while it is still at a temperature approaching its softening point, it is passed directly into and through a liquid bath 20 in container 24. Container 24 has an exit orifice 22 of suitable construction to maintain the liquid material in the bath while permitting passage of filament 10 as illustrated. Bath 20 may consist of any liquid or liquefied organic as previously described. If a solid material, such as a wax, is employed, suitable heating means (not shown) may be employed to maintain the material liquefied during operation of the system.

It will be appreciated that the organic material in bath 20 will tend to volatilize to some extent, regardless of the material employed. Hence, there will be some risk of combustion or flareup. This is particularly true since bath 20 may be positioned close to the zone heated by elements 18. To minimize this risk, a shield (not shown) may be provided to cover the bath. Alternatively, an inert atmosphere may be fed between blank 12 and heating elements 18 to flood the zone above the bath and sweep out combustible fumes.

Filament 10 cools very rapidly on the draw because of its minute cross section. Therefore, bath 20 must be in close proximity to the point of filament formation from blank 12. If this is not feasible, auxiliary heating means (not shown) must be provided to either maintain the filament at, or reheat it to, the required elevated temperature for immersion in the bath.

It will also be recognized that the geometry of the container 24 for liquid bath 20 will be so adjusted to the filament drawing speed as to provide for maintaining filament 10 in the bath until its temperature has been reduced to about 400° C. as required by the present inventive method.

Finally, as illustrated in the drawing, filament 10, with a vitreous carbon coating covering its surface, may be wound on a spool 26, or otherwise processed in accordance with standard optical filament practice.

Figure 2:
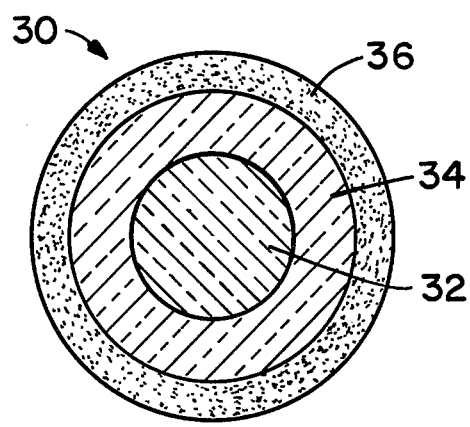

FIG. 2 shows, in greatly enlarged cross section, the coated filament 30 that is produced by practice of the method illustrated in FIG. 1. Coated filament 30 consists of glass core 32, glass cladding 34 and carbon coating 36 overlying the surface of glass cladding 34.

The following experimental examples further illustrate practice of the invention and the effect, or lack of effect, of variations therein:

EXAMPLES I-V

Rods of Code 7940 glass, a 100% silica glass available from Corning Glass Works, Corning, N.Y., were heated to the temperatures reported in the following Table. The rods were then plunged into a bath of molten beeswax heated to a temperature of about 70° C. The silica glass rods were left in the bath until their temperature reached about 200° C., i.e., a time not over five minutes. The rods were then withdrawn from the bath and washed with hot xylene (100° C.) to remove any adhering wax.

After cleaning, each rod exhibited a black lustrous surface having a visible radiation reflectivity of about 40% (compared to 100% for a vapor deposited aluminum mirror). Knoop hardness measurements ($KHN_{100}$) ranged between 703 and 744, clearly indicating a harder surface than the glass itself which had a $KHN_{100}$ of 509.

The following table records the preheat temperatures in °C. utilized with the glass rods, the thicknesses of the resulting coatings in Å, and the surface electrical resistivity (log p) measured at various temperatures in ohms-cms.

| Preheat Temp. | Coating Thickness | Log p −75° C. | Log p +25° C. | Log p +150° C. | Log p +400° C. | Log p +360° C. |
|---|---|---|---|---|---|---|
| 1300° | 200 | 3.233 | 3.233 | 3.231 | — | 3.329 |
| 1350° | 300 | 2.626 | 2.614 | 2.596 | — | — |
| 1400° | 500 | 2.550 | 2.542 | 2.518 | 3.000 | — |
| 1450° | 600 | 2.393 | 2.342 | 2.331 | — | 2.558 |
| 1500° | 1000 | 1.893 | 1.881 | 1.867 | 2.627 | — |

EXAMPLE VI

A 1" cube of Code 7971 glass, a titanium silicate glass available from Corning Glass Works, was subjected to the same processing as the glass rods of Examples I-V above. The resulting coating exhibited an appearance and physical properties very similar to those displayed by the coating of Example I.

EXAMPLE VII

A piece of tubing and a piece of cane of fused silica, produced by Quartz Scientific, Inc., Cleveland, Ohio, were heated to 1450° C., and then immersed into a bath of molten beeswax operating at 70° C. When the tubing and cane reached a temperature of about 200° C., they were removed from the bath and the excess beeswax washed off with hot xylene.

A lustrous black surface coating having a thickness of about 600 Å was produced which exhibited a visible radiation reflectivity of about 40% and a Knoop hardness $KHN_{100}$ of 740. The surface electrical resistivity at 23° C. was 1.8, at −70° C. was 1.786, and at 100° C. was 1.794. These values indicate a temperature coefficient of electrical resistivity of less than ±100 parts/million/°C.

EXAMPLE VIII

A rod of sintered alumina was heated to 1450° C. and then plunged into a bath of molten beeswax operating at 70° C. The rod was allowed to cool to the temperature of the bath and then withdrawn therefrom. After removing excess beeswax with hot xylene, a lustrous black surface coating was observed and the inherent pores in the surface of the rod were filled.

EXAMPLE IX

Sintered alumina crucibles, approximately four (4) inches in height and two (2) inches in diameter, and sintered silica crucibles, approximately two (2) inches in height and two (2) inches in diameter, were preheated to about 1450° C. The preheated crucibles were then immersed in a bath of molten beeswax at about 70° C. They were held in this bath until their temperature was in the range of 150°-200° C., the cooling time being on the order of five (5) minutes. When the crucibles were removed and cleaned, they had a metallic black appearance which was not as lustrous as glass cane and the like due to the rough substrate surface.

EXAMPLE X

A honeycomb substrate was prepared by extruding a mass of cordierite in accordance with the practices described in U.S. Pat. No. 3,790,654 (Bagley) granted Feb. 5, 1974. The honeycomb was heated to 1450° C. and then immersed in a molten beeswax bath as in the prior Example. It was removed after five minutes when its temperature had dropped below 400° C. The character of the carbon coated substrate approximated that of the sintered crucible, that is a metallic black surface having a slightly roughened appearance, but otherwise similar.

We claim:

1. A method for producing a vitreous carbon coating on the surface of a highly refractory substrate which comprises the steps:
   (a) providing a highly refractory substrate that is at a temperature in excess of about 1000° C.;
   (b) bringing said hot substrate into contact with a thermally decomposable organic material in liquid form, the temperature of said liquid being less than about 400° C. and said organic material having a flash point in excess of 200° F.;
   (c) maintaining said contact for a sufficient length of time to thermally decompose said organic material to from a vitreous carbon coating on the surface of said substrate;
   (d) cooling said substrate while in contact with said organic material to a temperature below about 400° C.; and thereafter
   (e) removing said substrate from contact with said organic material.

2. The method of claim 1 wherein said substrate is a silica glass.

3. The method of claim 1 wherein said substrate is a glass filament.

4. The method of claim 3 wherein said glass filament is drawn from a thermally softened glass blank and, while still above 1000° C. in temperature, is brought into contact with an organic material in liquid form.

5. The method of claim 1 wherein said hot substrate is brought into contact with said organic material by immersing into a bath of the organic material in liquid form.

6. The method of claim 5 wherein said substrate is a glass filament that is drawn through the bath.

7. The method of claim 5 wherein said organic material is normally solid and is liquefied by heating to a temperature below its decomposition temperature.

8. The method of claim 5 wherein said immersion is continued until the temperature of the substrate is not over 400° C., the coated substrate then being removed and cleaned.

9. The method of claim 8 wherein said substrate is cooled to substantially ambient temperature in the bath.

10. The method of claim 1 wherein said hydrocarbons and derivatives thereof are monomeric materials.

11. The method of claim 1 wherein said hydrocarbons and derivatives thereof are selected from the group consisting of paraffins, waxes, olefins, aromatics, glycols, tars, and asphalt.

* * * * *